United States Patent
Berggren et al.

(10) Patent No.: US 9,000,623 B2
(45) Date of Patent: Apr. 7, 2015

(54) USING THE TRANSFER SWITCH OF A HYBRID CIRCUIT BREAKER AS SELECTOR SWITCH

(75) Inventors: Bertil Berggren, Västerås (SE); Lars-Erik Juhlin, Ludvika (SE)

(73) Assignee: ABB Technology AG, Zürich (CH)

( * ) Notice: Subject to any disclaimer, the term of this patent is extended or adjusted under 35 U.S.C. 154(b) by 0 days.

(21) Appl. No.: 14/357,310

(22) PCT Filed: Nov. 11, 2011

(86) PCT No.: PCT/EP2011/069943
§ 371 (c)(1),
(2), (4) Date: May 9, 2014

(87) PCT Pub. No.: WO2013/068046
PCT Pub. Date: May 16, 2013

(65) Prior Publication Data
US 2014/0313641 A1    Oct. 23, 2014

(51) Int. Cl.
| | |
|---|---|
| H01H 19/64 | (2006.01) |
| H01H 31/10 | (2006.01) |
| H01H 33/52 | (2006.01) |
| H01H 33/59 | (2006.01) |
| H01H 47/00 | (2006.01) |
| H01H 85/46 | (2006.01) |
| H02B 1/00 | (2006.01) |
| H02H 7/26 | (2006.01) |
| H02J 3/36 | (2006.01) |

(52) U.S. Cl.
CPC ............... *H02B 1/00* (2013.01); *H02H 7/268* (2013.01); *H02J 3/36* (2013.01); *Y02E 60/60* (2013.01)

(58) Field of Classification Search
USPC .......... 307/113, 131, 135, 142, 141.8; 361/62
See application file for complete search history.

(56) References Cited

U.S. PATENT DOCUMENTS 7,508,636 B2 * 3/2009 Sellier et al. ................. 361/8

FOREIGN PATENT DOCUMENTS

| WO | 2011/057675 A1 | 5/2011 |
| WO | 2011/141053 A1 | 11/2011 |

OTHER PUBLICATIONS

J. J. Vithayathil et al., "HVDC Circuit Breaker Development and Field Tests", IEEE Transactions on Power Apparatus and Systems, IEEE Inc., vol. PAS-104, No. 10, pp. 2692-2705, Oct. 10, 1985.

* cited by examiner

*Primary Examiner* — Carlos Amaya
(74) *Attorney, Agent, or Firm* — Birch, Stewart, Kolasch & Birch, LLP (57) ABSTRACT

A high voltage direct current (HVDC) switchyard is provided. The switchyard is arranged for interconnecting three or more sections of an HVDC power network, such as transmission lines, converters, or any other type of HVDC equipment. The switchyard comprises at least one main circuit breaker and at least four transfer switches. The at least one main circuit breaker and the at least four transfer switches are arranged so as to enable to individually disconnect any one of the at least three sections of the HVDC power distribution network. In an embodiment of the invention, the transfer switches which usually are comprised in direct current (DC) hybrid circuit breakers are used as selector switches, thereby reducing the number of main breakers in the switchyard.

20 Claims, 11 Drawing Sheets

Fig. 11

# USING THE TRANSFER SWITCH OF A HYBRID CIRCUIT BREAKER AS SELECTOR SWITCH

FIELD OF THE INVENTION

The invention relates in general to high voltage direct current (HVDC) power distribution, and more specifically to HVDC switchyards comprising HVDC hybrid circuit breakers.

BACKGROUND OF THE INVENTION

In HVDC power networks, switchyards are used to interconnect several sections of the network. Such switchyards may be equipped with circuit breakers which allow to disconnect one or several network sections for the purpose of maintenance, or in order to isolate a faulty section. Each section may, e.g., comprise HVDC transmission lines, converters, or any other type of HVDC equipment. For instance, a switchyard may interconnect three or more HVDC transmission lines, wherein each of the transmission lines may be individually disconnected from the two others.

Due to the quickly rising fault currents in HVDC systems, direct current (DC) circuit breakers with a sufficiently high current breaking capability are needed. Recently, DC hybrid circuit breakers capable of breaking large fault currents have been proposed, see, e.g., WO 2011/057675.

DC hybrid circuit breakers are typically based on a combination of a solid-state main breaker connected in parallel to a transfer switch, i.e., a series-connection of a solid-state auxiliary breaker and a mechanical disconnector. The principal of operation of a hybrid circuit breaker is that the main breaker, the auxiliary breaker, and the disconnector are closed during normal operation. If a trip signal is received, the hybrid circuit breaker attempts to break the current flowing through it by first opening the auxiliary breaker, thereby commutating the current flowing through the auxiliary breaker and the disconnector to the main breaker. Subsequently, the disconnector is opened for disconnecting the auxiliary breaker, and finally the main breaker is opened, resulting in a commutation of the current from the main breaker to a surge arrester connected in parallel to the main breaker. However, DC hybrid circuit breakers are comparatively expensive, mostly owing to the design of the main breaker.

SUMMARY OF THE INVENTION

It is an object of the present invention to provide a more efficient alternative to the above techniques and prior art.

More specifically, it is an object of the present invention to provide an improved HVDC switchyard.

These and other objects of the present invention are achieved by means of a switchyard having the features defined in independent claim 1, and by means of a method of a switchyard defined in independent claim 18. Embodiments of the invention are characterized by the dependent claims.

According to a first aspect of the invention, a switchyard for interconnecting at least three sections of a DC power distribution network is provided. The switchyard comprises at least one main circuit breaker and at least four transfer switches. The at least one main circuit breaker and the at least four transfer switches are arranged so as to enable to individually disconnect any one of the at least three sections of the DC power distribution network.

According to a second aspect of the invention, a method of a switchyard is provided, for disconnecting any one of least three sections of a DC power distribution network connected to the switchyard. The switchyard comprises at least one main circuit breaker, and at least four transfer switches. The at least one main circuit breaker and the at least four transfer switches are arranged so as to enable to individually disconnect any one of the at least three sections of the DC power distribution network. The method comprises opening two of the at least four transfer switches, and, subsequently, opening a main circuit breaker of the at least one main circuit breaker.

The present invention makes use of an understanding that, in a switchyard being arranged for interconnecting, and individually disconnecting, sections of an HVDC network, the transfer switches which usually are comprised in DC hybrid circuit breakers may be used as selector switches. In this way, the number of main breakers in the switchyard may be reduced. In other words, for example, instead of providing each section connected to the switchyard with a DC hybrid circuit breaker being arranged for disconnecting the section from the switchyard, wherein each DC hybrid circuit breaker comprises a main breaker and a transfer switch, a single main breaker and a plurality of transfer switches may be used. The at least one main breaker and the plurality of transfer switches are arranged so as to be able to individually disconnect one, or several, of the network sections connected to the switchyard.

An embodiment of the invention is advantageous in that the number of main breakers may be reduced, as compared to prior art switchyards.

Preferably, an embodiment of the invention comprises only a single main breaker. Assuming that the main breaker of a DC circuit breaker is comparatively expensive, as compared to the transfer switch comprised in a DC hybrid circuit breaker, a switchyard according to an embodiment of the invention may be less expensive than a switchyard comprising several DC hybrid circuit breakers, each DC hybrid circuit breaker comprising a main breaker and a transfer switch.

According to an embodiment of the invention, the at least one main circuit breaker and the at least four transfer switches are arranged such that on a condition that at least two transfer switches of the at least four transfer switches are open at the same time, opening of a main circuit breaker of the at least one main circuit breaker causes disconnection of one of the at least three sections of the DC power distribution network from the DC power distribution network determined by which at least two transfer switches of the at least four transfer switches that are being open at the same time.

According to an embodiment of the invention, the switchyard comprises four transfer switches. The transfer switches are arranged so as to enable to individually disconnect any one of three sections of the DC power distribution network.

According to an embodiment of the invention, a first transfer switch of the four transfer switches is connected between a first section and a second section of the three sections of the DC power distribution network. A second transfer switch of the four transfer switches is connected between the first section and a third section of the three sections of the DC power distribution network. A series-connection of a third transfer switch and a fourth transfer switch of the four transfer switches is connected between the second section and the third section of the DC power distribution network. A main circuit breaker of the at least one main circuit breaker is connected between the first section of the DC power distribution network and a junction between the third transfer switch and the fourth transfer switch.

According to an embodiment of the invention, the switchyard comprises six transfer switches. The transfer switches are arranged so as to enable to individually disconnect any one of four sections of the DC power distribution network.

According to an embodiment of the invention, a first transfer switch of the six transfer switches is connected between a first section and a second section of the four sections of the DC power distribution network. A second transfer switch of the six transfer switches is connected between a third section and a fourth section of the four sections of the DC power distribution network. A series-connection of a third transfer switch and a fourth transfer switch of the six transfer switches is connected between the first section and the third section of the DC power distribution network. A series-connection of a fifth transfer switch and a sixth transfer switch of the six transfer switches is connected between the second section and the fourth section of the DC power distribution network. A main circuit breaker of the at least one main circuit breaker is connected between a first junction between the third transfer switch and the fourth transfer switch and a second junction between the fifth transfer switch and the sixth transfer switch.

According to an embodiment of the invention, the switchyard is arranged for disconnecting any one of the at least three sections of the DC power distribution network. A section of the DC power distribution network may be disconnected by opening two of the at least four transfer switches and, subsequently, one main circuit breaker of the at least one main circuit breaker.

According to an embodiment of the invention, the switchyard comprises nine transfer switches. The transfer switches are arranged so as to enable to individually disconnect any one of six sections of the DC power distribution network.

According to an embodiment of the invention, a first transfer switch of the nine transfer switches is connected between a first section and a second section of the six sections of the DC power distribution network. A second transfer switch of the nine transfer switches is connected between a third section and a fourth section of the six sections of the DC power distribution network. A third transfer switch of the nine transfer switches is connected between a fifth section and a sixth section of the six sections of the DC power distribution network. A series-connection of a fourth transfer switch and a fifth transfer switch of the nine transfer switches is connected between the first section and the third section of the DC power distribution network. A series-connection of a sixth transfer switch and a seventh transfer switch of the nine transfer switches is connected between the second section and the fourth section of the DC power distribution network. An eighth transfer switch of the nine transfer switches is connected between the fifth section and a first junction between the fourth transfer switch and the fifth transfer switch. A ninth transfer switch of the nine transfer switches is connected between the sixth section and a second junction between the sixth transfer switch and the seventh transfer switch. A main circuit breaker of the at least one main circuit breaker is connected between the first junction and the second junction.

According to an embodiment of the invention, the switchyard is arranged for disconnecting any one of the at least six sections of the DC power distribution network. A section of the DC power distribution network may be disconnected by opening three of the nine transfer switches and, subsequently, one main circuit breaker of the at least one main circuit breaker.

According to an embodiment of the invention, the switchyard further comprises at least three first disconnectors, one for each of the at least three sections of the DC power distribution network. The at least three first disconnectors are arranged for galvanically isolating a disconnected section from the switchyard. To this end, the first disconnectors are closed during normal operation. After the transfer switches and one main circuit breaker of the at least one main circuit breaker have been opened in order to disconnect one of the three sections of the DC power distribution network, the first disconnector which is associated with the disconnected section is opened. This is advantageous in that a section of the DC power distribution network may be galvanically isolated from the switchyard and, in turn, the DC power distribution network, after it has been disconnected by means of the transfer switches and the main circuit breaker.

According to an embodiment of the invention, the two open transfer switches are re-closed. This is advantageous in that the switchyard is prepared for the next fault. To this end, in order to disconnect a faulty section of the DC power distribution network connected to the switchyard, the following sequence may be performed. First, the fault current through the faulty section is cleared by opening two of the transfer switches, and, subsequently, one main circuit breaker of the at least one main circuit breaker. Then, the faulty section is galvanically isolated from the switchyard by opening the first disconnector which is associated with the faulty section. By opening the first disconnector, a residual current, which is typically of the order of a few Amperes, is cleared. Finally, the two open transfer switches are closed again, thereby preparing the switchyard for the next fault.

According to an embodiment of the invention, the switchyard further comprises second disconnectors. The second disconnectors are arranged for bypassing at least one main circuit breaker of the at least one main circuit breaker and the transfer switches. To this end, the second disconnectors are open during normal operation and may be closed in order to bypass one or several of the transfer switches and the main circuit breaker. This is advantageous in that the main circuit breaker and the transfer switches may be isolated for the purpose of maintenance.

According to an embodiment of the invention, at least one of the at least one main circuit breaker comprises a plurality of power semiconductor switching elements. The power semiconductor switching elements are connected in series.

According to an embodiment of the invention, the transfer switch comprises a disconnector and an auxiliary switch. The disconnector and the auxiliary switch are connected in series.

According to an embodiment of the invention, the switchyard comprises at least two main circuit breakers and a plurality of disconnectors arranged for at least momentarily galvanically isolating at least one of the at least two main circuit breakers and the at least four transfer switches from the switchyard. The at least two main circuit breakers and the at least four transfer switches are arranged so as to enable to individually disconnect any one of the at least three sections of the DC power distribution network while one of the at least two main circuit breakers and the at least four transfer switches is isolated from the switchyard by means of the plurality of disconnectors. Such a configuration may provide or enable an increased versatility and/or flexibility in operation of the switchyard with respect to disconnecting individual sections of the switchyard from the HVDC power network.

Even though advantages of the present invention have in some cases been described with reference to embodiments of the switchyard according to the first aspect of the invention, corresponding reasoning applies to embodiments of the method according to the second aspect of the invention. Further objectives of, features of, and advantages with, the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

Figure 1:
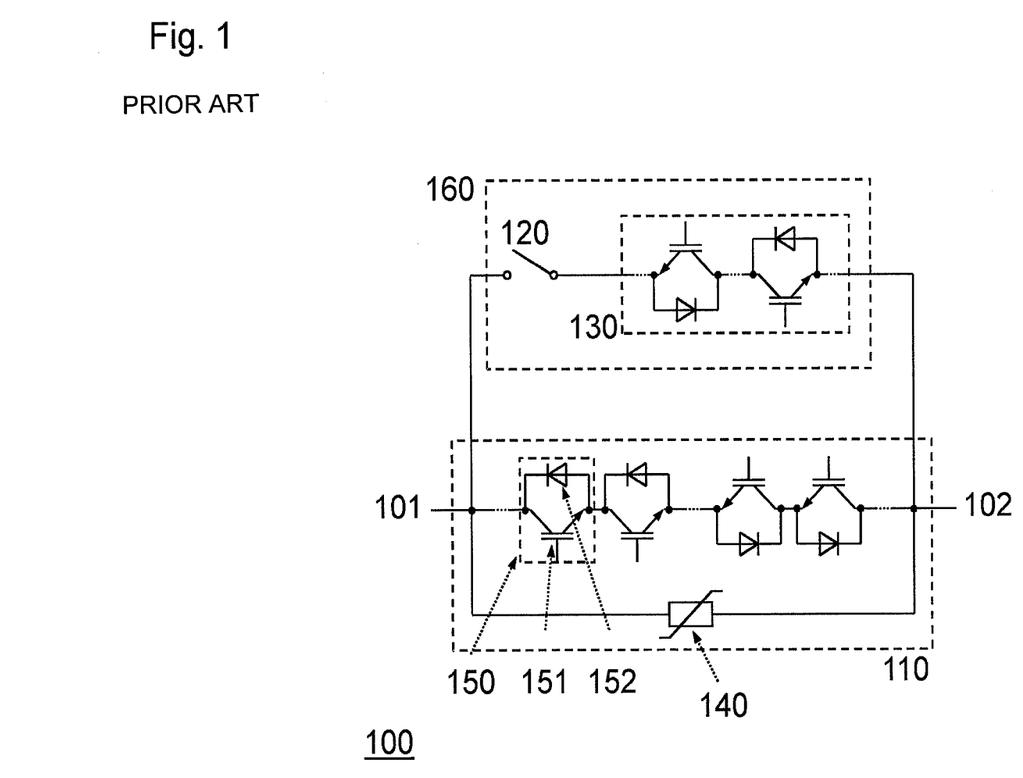
FIG. 1 shows an embodiment of a DC hybrid circuit breaker.

In FIG. 1, a DC hybrid circuit breaker, such as disclosed in WO 2011/057675, is illustrated.

Hybrid circuit breaker 100 comprises a main breaker 110, a fast disconnector, i.e., a high-speed switch, 120, and an auxiliary breaker 130. Disconnector 120 and auxiliary breaker 130 are connected in series, and the series-connection 160 of disconnector 120 and auxiliary breaker 130 is connected in parallel to main breaker 110. The series-connection 160 of disconnector 120 and auxiliary breaker 130 is frequently referred to as a transfer switch.

Hybrid circuit breaker 100 may be connected to an external circuit, such as an HVDC transmission line, at terminals 101 and 102. For instance, hybrid circuit breaker 100 may be used to connect an HVDC transmission line to a switchyard, for the purpose of disconnecting the transmission line from the busbar in the event of a failure, or for maintenance.

In the following, the principal of operation of hybrid circuit breaker 100 is described. During normal operation, main breaker 110, disconnector 120, and auxiliary breaker 130, are closed. If a trip signal is received by hybrid circuit breaker 100, circuit breaker 100 attempts to break the current flowing through it, i.e., from terminal 101 to 102, or vice versa, by first opening auxiliary breaker 130, thereby commutating the current flowing through auxiliary breaker 130 and disconnector 120 to main breaker 110. Subsequently, disconnector 120 is opened for disconnecting auxiliary breaker 130, and finally main breaker 110 is opened, resulting in a commutation of the current from main breaker 110 to a surge arrester 140 comprised in main breaker 110. Surge arrester 140 sets up a voltage which counteracts the flow of current through surge arrester 140, thereby gradually decreasing the current. Surge arrester 140 is designed such that the current will approach a value close to zero.

Main breaker 110, disconnector 120, and auxiliary breaker 130 may be based on different types of circuit breaker technologies. For instance, main breaker 110 and auxiliary breaker 130 may be based on solid-state switches 150, i.e., power semiconductor devices, such as transistors or thyristors. Main breaker 110 may, e.g., be based on solid-state switches 150 comprising an insulated bipolar gate transistor (IGBT) 151 and a diode 152 connected anti-parallel to transistor 151. Auxiliary breaker 130 may be based on the same or similar type of power semiconductor switch 150. In order to achieve higher voltage ratings, main breaker 110 and auxiliary breaker 130 may comprise a plurality of solid-state switches 150 connected in series. Further, in order to increase the current rating, main breaker 110 and auxiliary breaker 130 may be based on power semiconductor switches 150 connected in parallel. Disconnector 120 may, e.g., be based on a mechanical switch.

Figure 2:
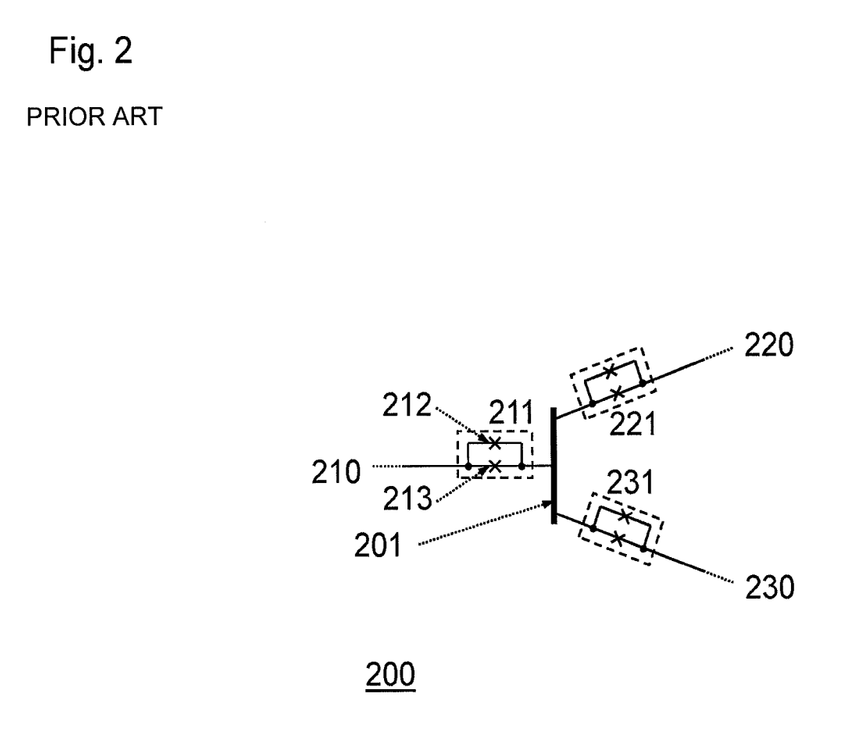
FIG. 2 shows a prior art HVDC switchyard.

In FIG. 2, a prior art HVDC switchyard is illustrated. Switchyard 200 is arranged for interconnecting three sections 210, 220, and 230, of an HVDC power network, such as HVDC transmission lines, converters, or any other type of HVDC equipment. Switchyard 200 comprises a busbar 201, and three DC hybrid circuit breakers 211, 221, and 231. Each DC hybrid circuit breaker 211, 221, and 231, comprises a main breaker 212 and a transfer switch 213 (for the sake of clarity, references numerals are shown in FIG. 2 for DC hybrid circuit breaker 211 only). DC hybrid circuit breakers 211, 221, and 231, are arranged for connecting HVDC network sections 210, 220, and 230, respectively, to busbar 201.

Each of DC hybrid circuit breakers 211, 221, and 231, may be used for disconnecting its associated network section 210, 220, and 230, from busbar 201, and, in turn, from the other sections. For instance, in order to disconnect section 220, for the purpose of maintenance or in the event of a fault in section 220, DC hybrid circuit breaker 221 may be opened, as was described hereinbefore.

Figure 3:
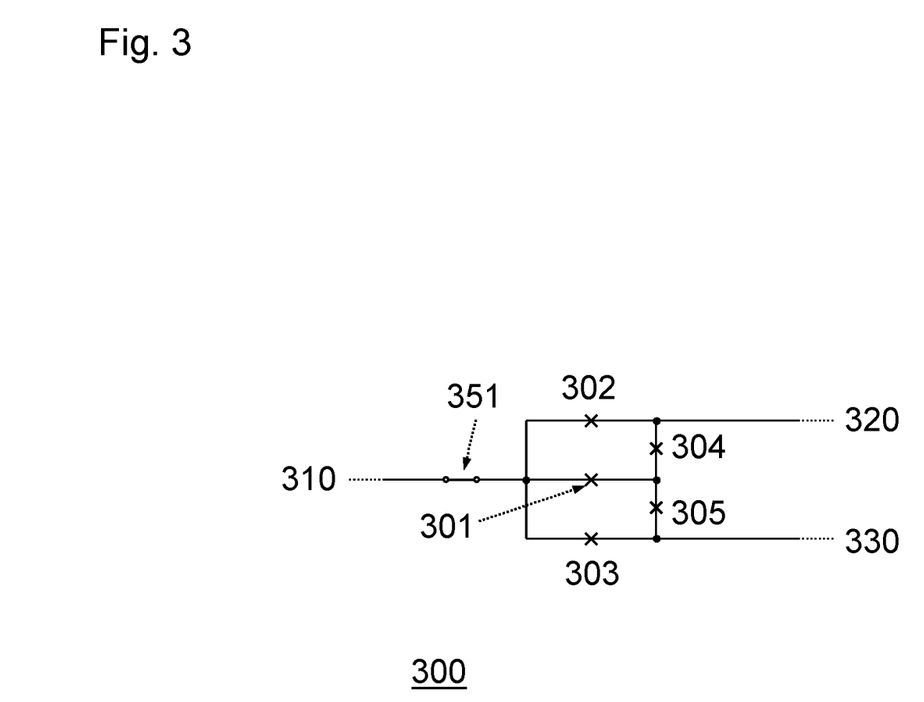
FIG. 3 shows an HVDC switchyard in accordance with an embodiment of the invention.

With reference to FIG. 3, an HVDC switchyard in accordance with an embodiment of the invention is described.

Switchyard 300 is arranged for interconnecting three sections 310, 320, and 330, of an HVDC power network, such as HVDC transmission lines, converters, and any other type of HVDC equipment. Switchyard 300 comprises a main breaker 301 and four transfer switches 302-305. Main breaker 301 and transfer switches 302-305 may be based on different types of circuit breaker technologies, as was discussed hereinbefore with reference to FIG. 1. For instance, main breaker 301 may comprise a plurality of power semiconductor switches connected in series, and each transfer switch 302-305 may comprise a fast disconnector and an auxiliary breaker connected in series. The auxiliary breaker, in turn, may be based on one or several power semiconductor switches. Typically, main breaker 301 is more expensive than any one of transfer switches 302-305.

In the following, the sequences performed for disconnecting any one of sections 310, 320, and 330, are explained. During normal operation, main breaker 301 and transfer switches 302-305 are closed. In order to disconnect section 310, e.g., for the purpose of maintenance or due to a fault in section 310, transfer switches 302 and 303 are opened, and subsequently main breaker 301 is opened. Correspondingly, in order to disconnect section 320, transfer switches 302 and 305 are opened, and subsequently main breaker 301 is opened. Finally, in order to disconnect section 330, transfer switches 303 and 304 are opened, and subsequently main breaker 301 is opened.

Further with respect to the sequence for disconnecting section 320, once transfer switches 302 and 305 are open, the current through main breaker 301 and transfer switch 304 will decrease and eventually reach a value close to zero. When the current through transfer switch 304 is sufficiently low, transfer switch 304 may be opened and transfer switch 305 may be closed again, after which switchyard 300 is prepared for the next fault. A corresponding reasoning applies to section 330, but not for section 310. In other words, restoring switchyard 300 such that it is prepared for the next fault may be performed for sections which have a transfer switch between the main breaker and the disconnected section.

The switchyard 300 comprises a disconnector 351 which is arranged for galvanically isolating section 310 from switchyard 300. This may be advantageous in case, after main breaker 301 and transfer switches 302-305 have completed their breaking action, a residual current is flowing though the disconnected section. Such a residual current may be cleared by opening the disconnector 351 by which the disconnected section 310 is connected to switchyard 300. The disconnector 351 is optional.

Alternatively or optionally, a disconnector may be arranged in switchyard 300 by which the section 320 and/or a disconnector by which the section 330 is connected to switchyard 300, arranged for galvanically isolating sections 320 and/or section 330, respectively, from switchyard 300, analogously to the arrangement of disconnector 351 by which the section 310 is connected to switchyard 300.

Figure 4:
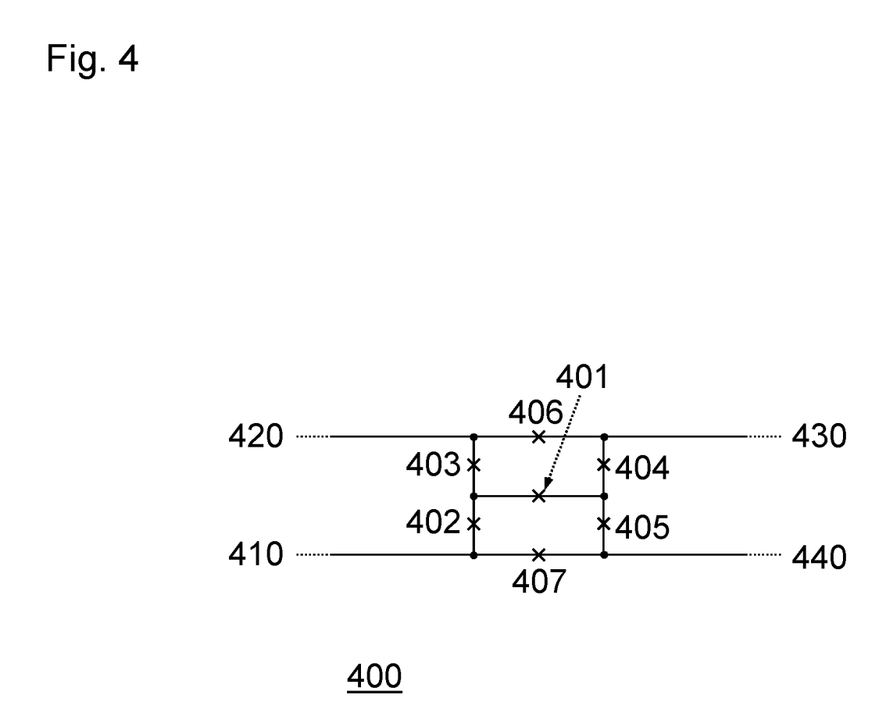
FIG. 4 shows an HVDC switchyard in accordance with another embodiment of the invention.

In FIG. 4, an HVDC switchyard in accordance with another embodiment of the invention is illustrated.

Switchyard 400 is arranged for interconnecting four sections 410, 420, 430, and 440, of an HVDC power network, such as HVDC transmission lines, converters, and any other type of HVDC equipment. Switchyard 400 comprises a main breaker 401 and six transfer switches 402-407. Main breaker 401 and transfer switches 402-407 may be based on different types of circuit breaker technologies, as was discussed hereinbefore with reference to FIG. 1. For instance, main breaker 401 may comprise a plurality of power semiconductor switches connected in series, and each transfer switch 402-407 may comprise a fast disconnector and an auxiliary breaker connected in series. The auxiliary breaker, in turn, may be based on one or several power semiconductor switches. Typically, main breaker 401 is more expensive than any one of transfer switches 402-407.

In the following, the sequences performed for disconnecting any one of sections 410, 420, 430, and 440, are explained. During normal operation, main breaker 401 and transfer switches 402-407 are closed. In order to disconnect section 410, e.g., for the purpose of maintenance or due to a fault in section 410, transfer switches 403 and 407 are opened, and subsequently main breaker 401 is opened. Correspondingly, in order to disconnect section 420, transfer switches 402 and 406 are opened, and subsequently main breaker 401 is opened. Further, in order to disconnect section 430, transfer switches 405 and 406 are opened, and subsequently main breaker 401 is opened. Finally, in order to disconnect section 440, transfer switches 404 and 407 are opened, and subsequently main breaker 401 is opened.

In switchyard 400, there is always a transfer switch between main breaker 401 and a disconnected section, such that switchyard 400 may be prepared for the next fault. For instance, with respect to the sequence for disconnecting section 420, once transfer switches 402 and 406 are open, the current through main breaker 401 and transfer switch 403 will decrease and eventually reach a value close to zero. When the current through transfer switch 403 is sufficiently low, transfer switch 403 may be opened and transfer switch 402 may be closed again, after which switchyard 400 is prepared for the next fault. A corresponding reasoning applies to all other sections 410, 430, and 440.

Figure 5:
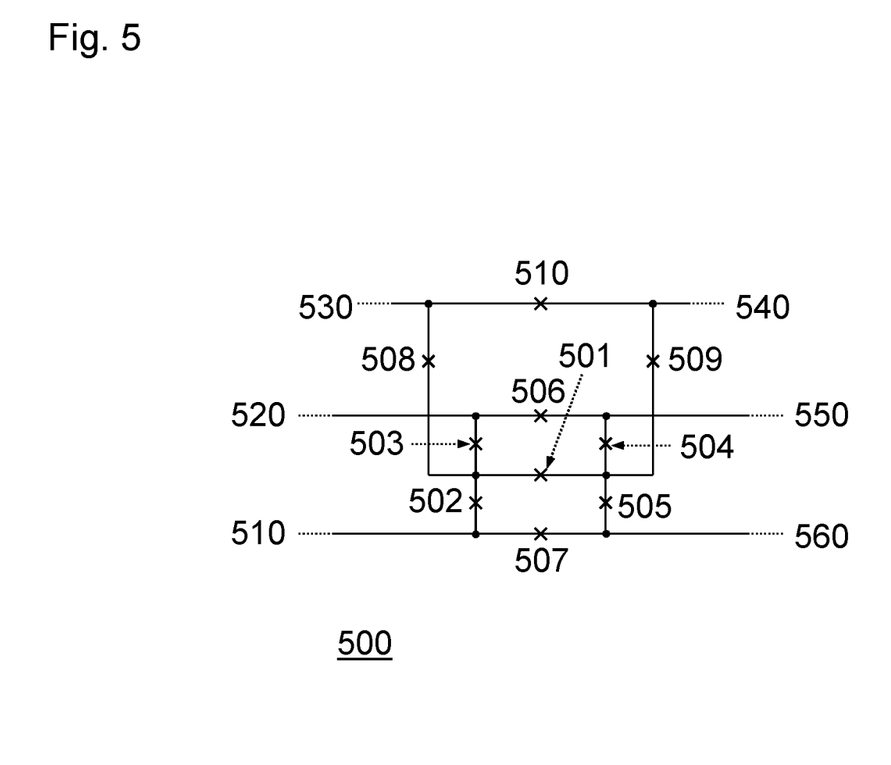
FIG. 5 shows an HVDC switchyard in accordance with a further embodiment of the invention.

A further embodiment of an HVDC switchyard, in accordance with the invention, is illustrated in FIG. 5.

Switchyard 500 is arranged for interconnecting six sections 510, 520, 530, 540, 550, and 560, of an HVDC power network, such as HVDC transmission lines, converters, and any other type of HVDC equipment. Switchyard 500 comprises a main breaker 501 and nine transfer switches 502-510. Main breaker 501 and transfer switches 502-510 may be based on different types of circuit breaker technologies, as was discussed hereinbefore with reference to FIG. 1. For instance, main breaker 501 may comprise a plurality of power semiconductor switches connected in series, and each transfer switch 502-510 may comprise a fast disconnector and an auxiliary breaker connected in series. The auxiliary breaker, in turn, may be based on one or several power semiconductor switches. Typically, main breaker 501 is more expensive than any one of transfer switches 502-510.

As an example, the sequence performed for disconnecting section 540 is illustrated. During normal operation, main breaker 501 and transfer switches 502-510 are closed. In order to disconnect section 540, e.g., for the purpose of maintenance or due to a fault in section 540, transfer switches 504, 505, and 510, are opened, and subsequently main breaker 501 is opened. Corresponding sequences apply for disconnecting any other section 510, 520, 530, 550, and 560.

Alternatively or optionally, at least one disconnector may be arranged in switchyard 500 by which the section 510, 520, 530, 540, 550 and/or 560 is connected to switchyard 500, arranged for galvanically isolating sections 510, 520, 530, 540, 550 and/or 560, respectively, from switchyard 500, analogously to the arrangement of disconnector or disconnectors described with reference to FIG. 3.

Figure 6:
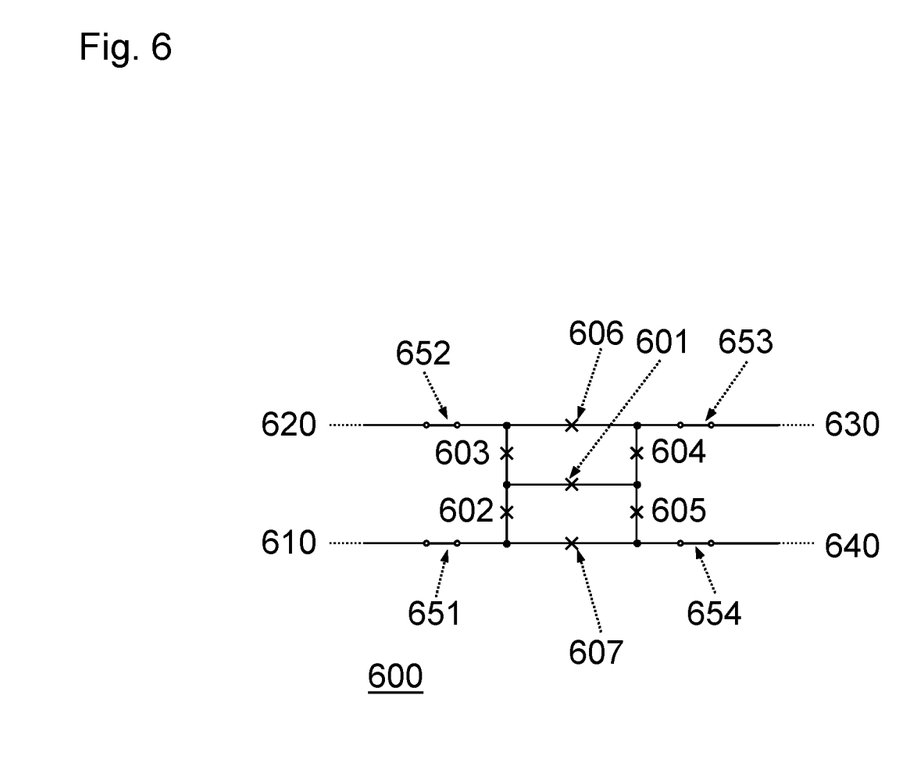
FIG. 6 shows an HVDC switchyard in accordance with yet another embodiment of the invention.

With reference to FIG. 6, yet a further embodiment of the invention is illustrated.

Switchyard 600 is similar to switchyard 400, described with reference to FIG. 4, in that it comprises a main breaker 601 and six transfer switches 602-607, the switchyard being arranged for disconnecting any one of sections 610, 620, 630, and 640, connected to it. Switchyard 600 further comprises disconnectors 651-654 which are arranged for galvanically isolating sections 610, 620, 630, and 640, respectively, from switchyard 600. This is advantageous if, after main breaker 601 and transfer switches 602-607 have completed their breaking action, a residual current is flowing though the disconnected section. Such a residual current may be cleared by opening the disconnector by which the disconnected section is connected to switchyard 600.

To this end, main breaker 601, transfer switches 602-607, and disconnectors 651-654 are closed during normal operation. If, e.g., section 610 is to be disconnected in response to a fault, the following sequence is performed. First, transfer switches 603 and 607, are opened, and subsequently main breaker 601 is opened. Then, after transfer switches 603 and 607, as well as main breaker 601 have completed their breaking action, disconnector 651 is opened to galvanically isolate section 610 from switchyard 600, thereby clearing any residual current. After section 610 has been galvanically isolated by opening disconnector 651, transfer switches 603 and 607, as well as main breaker 601, may be closed again, thereby preparing switchyard 600 for the next fault. Corresponding sequences apply for disconnecting any other section 620, 630, and 640.

Preferably, the normally closed disconnectors 651-654 should have a current breaking capability which is sufficiently high in order to clear any residual current. Typically, the residual current is rather small, of the order of a few Ampere, and depends on the design of main breaker 601.

An arrangement of disconnectors 651-654 such as shown in FIG. 6 may also be provided in either of switchyards 400 and 500 described with reference to FIGS. 4 and 5, respectively, analogous to the arrangement of disconnectors 651-654 shown in FIG. 6.

Figure 7:
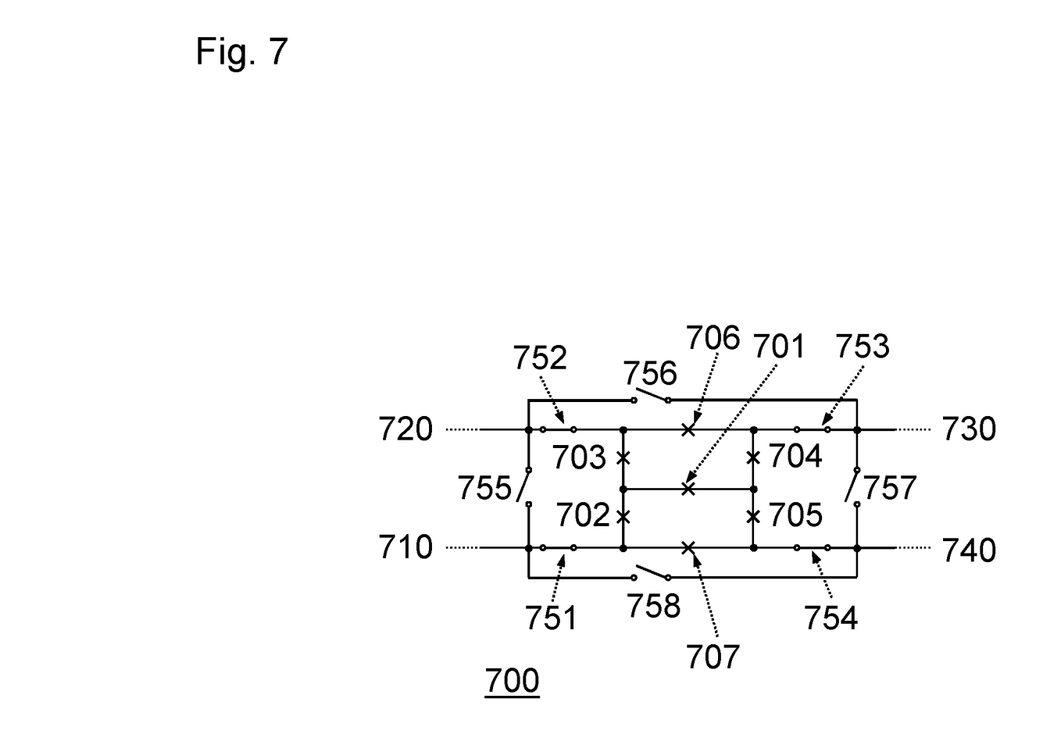
FIG. 7 shows an HVDC switchyard in accordance with yet a further embodiment of the invention.

With reference to FIG. 7, yet a further embodiment of the invention is illustrated.

Switchyard 700 is similar to switchyard 600, described hereinbefore, in that it comprises a main breaker 701, six transfer switches 702-707, and disconnectors 751-754, one for each network section. Switchyard 700 further comprises disconnectors 755-758 which are arranged for by-passing main breaker 701 and/or transfer switches 702-707. This is advantageous if main breaker 701 and/or transfer switches 702-707 are to be taken out of service for maintenance purposes.

To this end, during normal operation, disconnectors 751-754 are closed, whereas disconnectors 755-758 are open. In order to isolate main breaker 701 and transfer switches 702-707, the normally open disconnectors 755-758 are closed, and the normally closed disconnectors 751-754 are opened. Further, in the event that one of sections 710, 720, 730, and 740, is disconnected, e.g., section 710, main breaker 701 and transfer switches 702-707 may be isolated for maintenance by closing disconnectors 756 and 757, and then opening disconnectors 752-754.

As an alternative solution for allowing for maintenance of the main breaker and the transfer switches, an embodiment of the invention may be provided with backup breakers and backup switches, as is known in the art.

Further with reference to FIG. 7, disconnectors 751-754 may also be used for galvanically isolating a disconnected section from switchyard 700, as was described with reference to FIG. 6.

It will also be appreciated that a switchyard in accordance with an embodiment of the invention may be arranged for re-connecting a disconnected section to the switchyard. For example, considering switchyard 600 discussed with reference to FIG. 6, disconnected section 610 may be re-connected by first opening transfer switches 603 and 607, then opening main breaker 601, closing disconnector 651, closing main breaker 601, and finally closing transfer switches 603 and 607.

Even though embodiments of the invention comprising disconnectors being arranged for galvanically isolating network sections connected to the switchyard, and/or comprising disconnectors being arranged for isolating the main breaker and the transfer switches comprised in the switchyard for the purpose of maintenance, have been illustrated as interconnecting four sections of a DC power distribution network, embodiments of the invention being arranged for interconnecting three or more than four network sections may easily be envisaged.

Figure 8:
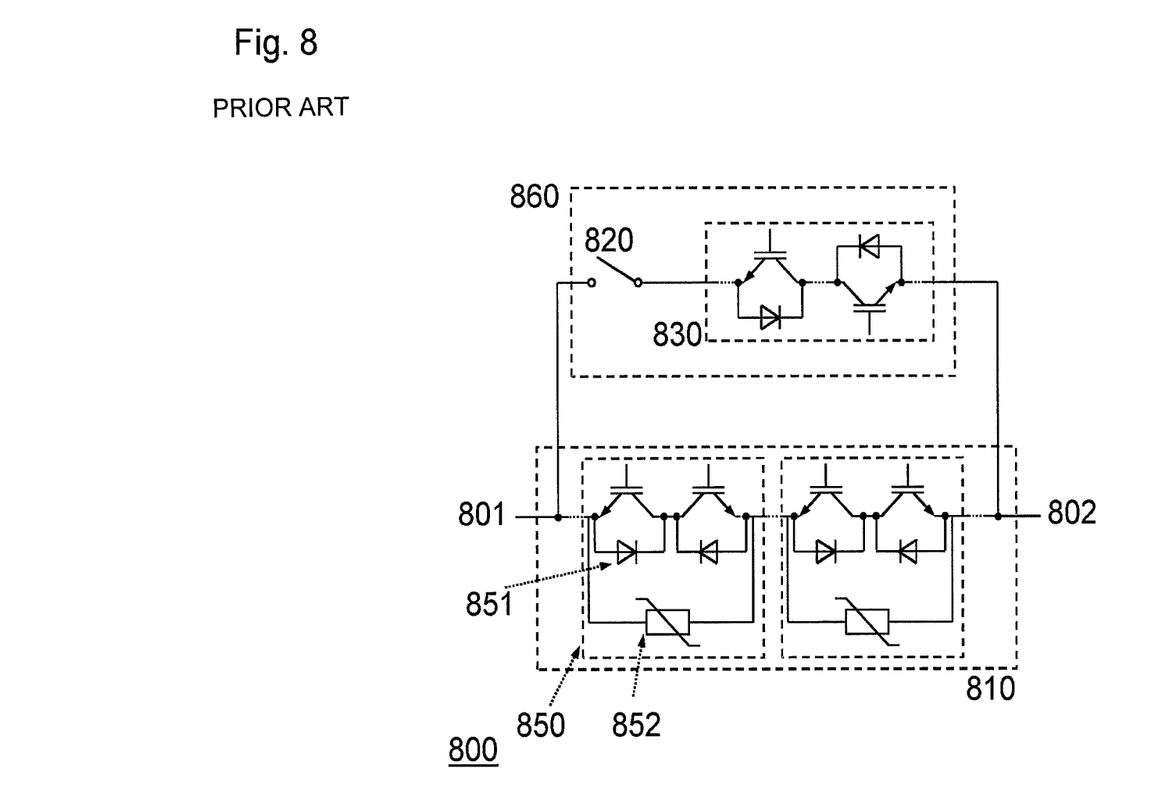
FIG. 8 shows an alternative embodiment of a DC hybrid circuit breaker.

With reference to FIG. 8, an alternative embodiment of a DC hybrid circuit breaker, described in WO 2011/057675, is illustrated.

DC hybrid circuit breaker 800 is similar to hybrid circuit breaker 100, described with reference to FIG. 1, in that it comprises a main breaker 810, a fast disconnector, i.e., a high-speed switch, 820, and an auxiliary breaker 830. Disconnector 820 and auxiliary breaker 830 are connected in series, and the series-connection 860, i.e., the transfer switch, of disconnector 820 and auxiliary breaker 830 is connected in parallel to main breaker 810. Hybrid circuit breaker 800 may be connected to an external circuit, such as an HVDC transmission line, at terminals 801 and 802. For instance, hybrid circuit breaker 800 may be used to connect an HVDC transmission line to a switchyard, for the purpose of disconnecting the transmission line from the busbar in the event of a failure, or for maintenance.

Main breaker 810, disconnector 820, and auxiliary breaker 830 may be based on different types of circuit breaker technologies, as was discussed with reference to FIG. 1. In particular, in order to achieve higher voltage ratings, main breaker 810 may comprise a plurality of solid-state switches connected in series. Whereas main breaker 110 was illustrated as comprising a series-connection of solid-state switches 150 and a single surge arrester 140 connected in parallel to the series-connection of solid-state switches 150, main breaker 810 employs a sectionalized design comprising a plurality of sections 850. To this end, in accordance with the depicted example, each section 850 comprises two solid-state switches 851 and a surge arrester 852 connected in parallel to the two solid-state switches 851. This may be advantageous in that an embodiment of the invention may be used as a current limiting device. To this end, depending on the desired function of hybrid breaker 800, i.e., either for breaking the fault current or for limiting it, either all solid-state switches 850 comprised in main breaker 810 or only a fraction of the solid-state switches 850 are opened. Using a sectionalized design is further advantageous in that redundancy may be provided by using more sections than what is required in order to achieve a desired voltage rating.

Figure 9:
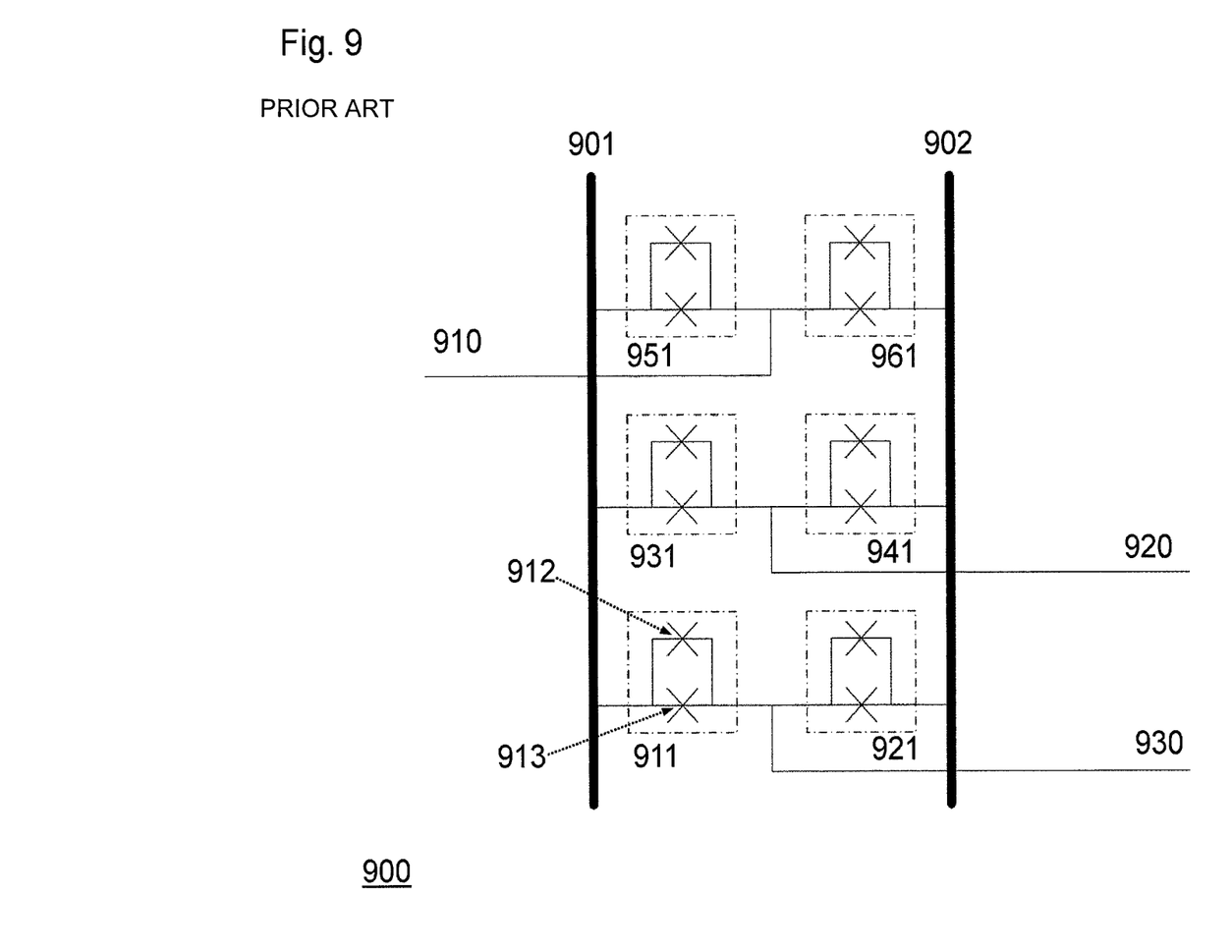
FIG. 9 shows another prior art HVDC switchyard.

In FIG. 9, a prior art HVDC switchyard 900 is illustrated. Switchyard 900 is arranged for interconnecting three sections 910, 920, and 930, of an HVDC power network, such as HVDC transmission lines, converters, or any other type of HVDC equipment. Switchyard 900 comprises two busbars 901, 902, and six DC hybrid circuit breakers 911, 921, 931, 941, 951 and 961. Each DC hybrid circuit breaker 911, 921, 931, 941, 951 and 961 comprises a main breaker 912 and a transfer switch 913 (references numerals for the main breaker and transfer switch of respective DC hybrid circuit breaker 911, 921, 931, 941, 951 and 961 are shown in FIG. 9 for DC hybrid circuit breaker 911 only).

DC hybrid circuit breakers 911, 931 and 951 are arranged for connecting HVDC network sections 910, 920 and 930, respectively, to busbar 901.

DC hybrid circuit breakers 921, 941 and 961 are arranged for connecting HVDC network sections 910, 920 and 930, respectively, to busbar 902.

Figure 10:
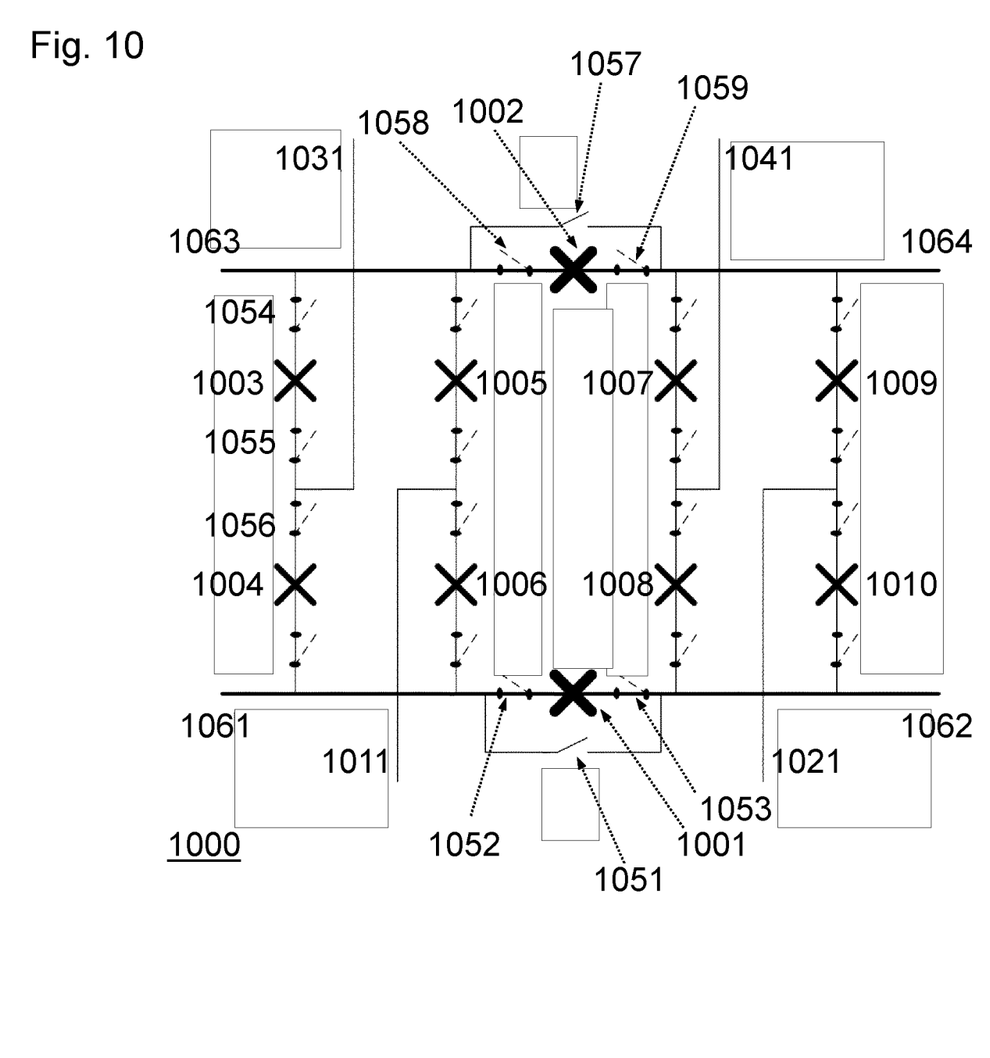
FIG. 10 shows an HVDC switchyard in accordance with an embodiment of the invention.

Referring now to FIG. 10, there is shown a schematic view of a HVDC switchyard 1000 according to an embodiment of the invention.

Switchyard 1000 is arranged for interconnecting four sections 1011, 1021, 1031 and 1041, of an HVDC power network, such as HVDC transmission lines, converters, and any other type of HVDC equipment. Switchyard 1000 comprises two main circuit breakers 1001, 1002 and eight transfer switches 1004 to 1010. The main circuit breakers 1001, 1002 and the transfer switches 1003-1010 may be based on different types of circuit breaker technologies, as was discussed hereinbefore with reference to FIG. 1. For instance, each of main circuit breakers 1001, 1002 may comprise a plurality of power semiconductor switches connected in series, and/or each transfer switch 1003-1010 may comprise a fast disconnector and an auxiliary breaker connected in series. The auxiliary breaker, in turn, may be based on one or several power semiconductor switches. Typically, main circuit breaker 1001, 1002 is more expensive than any one of transfer switches 1003-1010.

Switchyard 1000 comprises busbars 1061-1064.

Switchyard 1000 comprises disconnectors 1051-1059. Only some disconnectors are indicated by reference numerals in FIG. 10. Disconnectors 1051-1059 may for example be utilized for maintenance purposes.

For example, disconnectors 1055 and 1056 may be arranged for galvanically isolating section 1031 from switchyard 1000. This may be advantageous in case, after section 1031 has been disconnected by breaking action of some of the breakers (discussed further in the following), a residual current is flowing though the disconnected section 1031. Such a residual current may be cleared by opening the disconnectors 1055, 1056 by which the disconnected section 1031 is connected to switchyard 1000.

The embodiment illustrated in FIG. 10 may be particularly advantageous for isolating a transfer switch or a main circuit breaker, e.g. in case a transfer switch or a main circuit breaker, respectively, is to be at least momentarily taken out of service for maintenance purposes or for replacing a faulty component. This is described further in the following with reference to some examples of operating the HVDC switchyard 1000.

For example, in case section 1031 is to be disconnected from the HVDC power network, transfer switches 1004 and 1005 may be opened, and subsequently main circuit breaker 1002 may be opened. In this way, section 1031 is connected to busbar 1063 but not to any of the sections 1011, 1021 and 1041.

In alternative, in case section 1031 is to be disconnected from the HVDC power network, transfer switches 1003 and 1006 may be opened, and subsequently main circuit breaker 1001 may be opened. In this way, section 1031 is connected to busbar 1061 but not to any of the sections 1011, 1021 and 1041.

After disconnection of section 1031, section 1031 may be galvanically isolated by opening disconnectors 1055 and 1056. Then, transfer switches 1004 and 1005 and main circuit breaker 1002, or transfer switches 1003 and 1006 and main circuit breaker 1001, may be closed again, thereby preparing switchyard 1000 for occurrence of a possible subsequent fault.

By opening disconnectors 1054 and 1055, maintenance can be performed on transfer switch 1003. In case it is desired to disconnect section 1031 from the HVDC power network, e.g. in case of a fault occurring in section 1031 that must be cleared, transfer switch 1006 may be opened and subsequently main circuit breaker 1001 may be opened, whereby section 1031 becomes disconnected from the HVDC power network.

In case maintenance is to be performed on main circuit breaker 1002, disconnector 1057 can be closed and disconnectors 1058 and 1059 can be opened. Subsequently, in case one of the sections 1011, 1021, 1031 and 1041 is to be disconnected, main circuit breaker 1001 may be used to effectuate or facilitate disconnection of one of the sections 1011, 1021, 1031 and 1041 from the DC power network, e.g. in a way described in the foregoing.

Similarly, in case maintenance is to be performed on main circuit breaker 1001, disconnector 1051 can be closed and disconnectors 1052 and 1053 can be opened. Subsequently, in case one of the sections 1011, 1021, 1031 and 1041 is to be disconnected, main circuit breaker 1002 may be used to effectuate or facilitate disconnection of one of the sections 1011, 1021, 1031 and 1041 from the DC power network, e.g. in a way described in the foregoing.

The embodiment illustrated in FIG. 10 has been described in the foergoing with respect to disconnection of section 1031 from the DC power network. However, the same or similar principles of operation apply analogously with respect to disconnection of any one of sections 1011, 1021 or 1041 from the DC power network.

Figure 11:
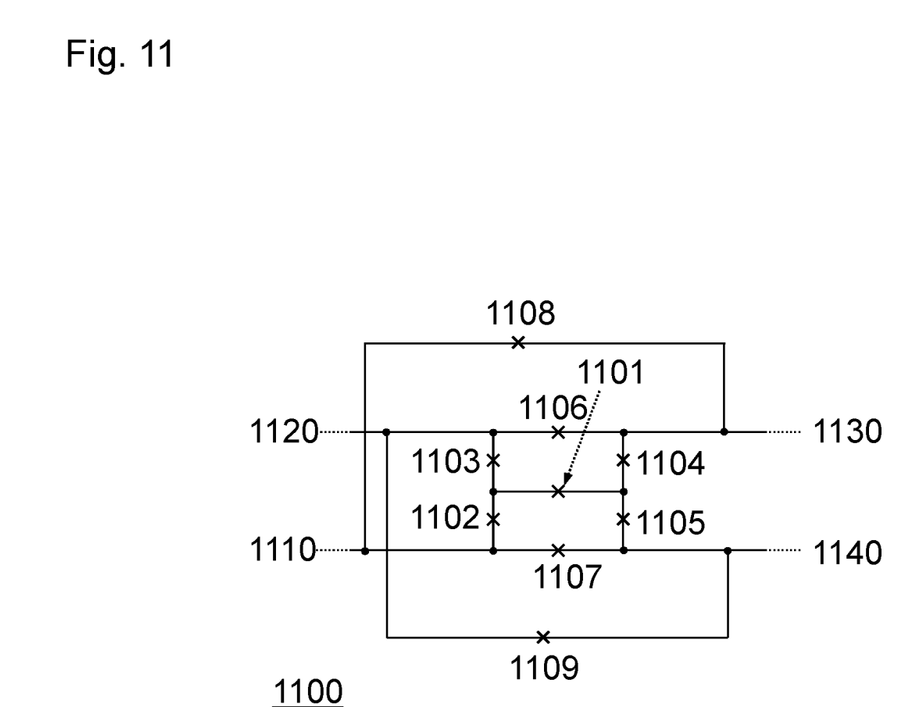
FIG. 11 shows an HVDC switchyard in accordance with an embodiment of the invention.

By an embodiment such as illustrated in FIG. 10, performing maintenance on one of the transfer switches 1003-1010 and main circuit breakers 1001, 1002 at a time without having to interrupt operation of the entire switchyard 1000 may be facilitated or enabled. Referring now to FIG. 11, there is shown a schematic view of a HVDC switchyard 1100 according to an embodiment of the invention.

HVDC switchyard 1100 is similar to the HVDC switchyard 400 described with reference to FIG. 4.

Switchyard 1100 is arranged for interconnecting four sections 1110, 1120, 1130, and 1140, of an HVDC power network, such as HVDC transmission lines, converters, and any other type of HVDC equipment. Switchyard 1100 comprises a main circuit breaker 1101 and eight transfer switches 1102-1109. Main circuit breaker 1101 and transfer switches 1102-1109 may be based on different types of circuit breaker technologies, as was discussed hereinbefore with reference to FIG. 1.

The main circuit breaker 1101 and the transfer switches 1102-1107 are similar or identical to the components 401 and 402-407, respectively, in the switchyard 400 described with reference to FIG. 4 and the operation of the main circuit breaker 1101 and the transfer switches 1102-1107 is similar or identical to operation of components 401 and 402-407, respectively, in the switchyard 400 described with reference to FIG. 4.

In contrast to the switchyard 400 described with reference to FIG. 4, switchyard 1100 comprises additional transfer switches 1108 and 1109 arranged between sections 1110 and 1130 and between sections 1120 and 1140, respectively.

The arrangement of transfer switch 1108 and/or transfer switch 1109 may provide or enable an increased versatility and/or flexibility in operation of the switchyard 1100 with respect to disconnecting individual sections of the switchyard 1100 from the HVDC power network, which is described with reference to the following exemplifying scenarios. In a case where transfer switches 1103 and 1106 are open, it may be undesirable and/or unfeasible to disconnect section 1140 from the HVDC power network by opening transfer switches 1104 and 1107 and subsequently opening main circuit breaker 1101, since in this case section 1130 would be connected to the switchyard 1100 solely by means of transfer switch 1104 unless the arrangement of transfer switch 1109 is provided. Similarly, in a case where transfer switches 1105 and 1107 are open, it may be undesirable and/or unfeasible to disconnect section 1120 from the HVDC power network by opening transfer switches 1102 and 1106 and subsequently opening main circuit breaker 1101, since in this case section 1110 would be connected to the switchyard 1100 solely by means of transfer switch 1102 unless the arrangement of transfer switch 1108 is provided.

Referring now again to FIG. 5, arrangement of transfer switch 1108 and/or transfer switch 1109 as shown in FIG. 11 may be applied analogously to the switchyard 500 described with reference to FIG. 5 so as provide a similar or the same function as provided by arrangement of transfer switch 1108 and/or transfer switch 1109 shown in FIG. 11. For example, switchyard 500 may be provided with a transfer switch arranged between sections 510 and 550, analogously to transfer switch 1108 arranged between sections 1110 and 1130 in FIG. 11, and/or a transfer switch arranged between sections 520 and 560, analogously to transfer switch 1109 arranged between sections 1120 and 1140 in FIG. 11.

The person skilled in the art realizes that the present invention by no means is limited to the embodiments described above. On the contrary, many modifications and variations are possible within the scope of the appended claims. For example, embodiments of the invention being arranged for interconnecting any number of sections of an HVDC power network may easily be envisaged.

In conclusion, an HVDC switchyard is provided. The switchyard is arranged for interconnecting three or more sections of an HVDC power network, such as transmission lines, converters, or any other type of HVDC equipment. The switchyard comprises at least one main circuit breaker and at least four transfer switches. The at least one main circuit breaker and the at least four transfer switches are arranged so as to enable to individually disconnect any one of the at least three sections of the HVDC power distribution network. In an embodiment of the invention, the transfer switches which usually are comprised in DC hybrid circuit breakers are used as selector switches, thereby reducing the number of main breakers in the switchyard.

The invention claimed is:

1. A switchyard for interconnecting at least three sections of a direct current, DC, power distribution network, the switchyard comprising:
  at least one main circuit breaker, and
  at least four transfer switches,
  wherein the at least one main circuit breaker and the at least four transfer switches are arranged so as to enable to individually disconnect any one of the at least three sections of the DC power distribution network,
  wherein the at least one main circuit breaker and the at least four transfer switches are arranged such that on a condition that at least two transfer switches of the at least four transfer switches are open at the same time, opening of a main circuit breaker of the at least one main circuit breaker causes disconnection of one of the at least three sections of the DC power distribution network from the DC power distribution network determined by which at least two transfer switches of the at least four transfer switches that are being open at the same time.

2. The switchyard according to claim 1, comprising four transfer switches being arranged so as to enable to individually disconnect any one of three sections of the DC power distribution network.

3. The switchyard according to claim 2, wherein:
  a first transfer switch of the four transfer switches is connected between a first section and a second section of the three sections of the DC power distribution network,
  a second transfer switch of the four transfer switches is connected between the first section and a third section of the three sections of the DC power distribution network,
  a series-connection of a third transfer switch and a fourth transfer switch of the four transfer switches is connected between the second section and the third section of the DC power distribution network, and
  a main circuit breaker of the at least one main circuit breaker is connected between the first section of the DC power distribution network and a junction between the third transfer switch and the fourth transfer switch.

4. The switchyard according to claim 3, being arranged for disconnecting any one of the at least three sections of the DC power distribution network by opening two of the at least four transfer switches and, subsequently, one main circuit breaker of the at least one main circuit breaker.

5. The switchyard according to claim 2, being arranged for disconnecting any one of the at least three sections of the DC power distribution network by opening two of the at least four transfer switches and, subsequently, one main circuit breaker of the at least one main circuit breaker.

6. The switchyard according to claim 1, comprising six transfer switches being arranged so as to enable to individually disconnect any one of four sections of the DC power distribution network.

7. The switchyard according to claim 6, wherein:
  a first transfer switch of the six transfer switches is connected between a first section and a second section of the four sections of the DC power distribution network,
  a second transfer switch of the six transfer switches is connected between a third section and a fourth section of the four sections of the DC power distribution network,
  a series-connection of a third transfer switch and a fourth transfer switch of the six transfer switches is connected between the first section and the third section of the DC power distribution network,
  a series-connection of a fifth transfer switch and a sixth transfer switch of the six transfer switches is connected between the second section and the fourth section of the DC power distribution network, and
  a main circuit breaker of the at least one main circuit breaker is connected between a first junction between the third transfer switch and the fourth transfer switch and a second junction between the fifth transfer switch and the sixth transfer switch.

8. The switchyard according to claim 7, being arranged for disconnecting any one of the at least three sections of the DC power distribution network by opening two of the at least four transfer switches and, subsequently, one main circuit breaker of the at least one main circuit breaker.

9. The switchyard according to claim 6, being arranged for disconnecting any one of the at least three sections of the DC power distribution network by opening two of the at least four transfer switches and, subsequently, one main circuit breaker of the at least one main circuit breaker.

10. The switchyard according to claim 1, comprising nine transfer switches being arranged so as to enable to individually disconnect any one of six sections of the DC power distribution network.

11. The switchyard according to claim 10, wherein:
  a first transfer switch of the nine transfer switches is connected between a first section and a second section of the six sections of the DC power distribution network,
  a second transfer switch of the nine transfer switches is connected between a third section and a fourth section of the six sections of the DC power distribution network,
  a third transfer switch of the nine transfer switches is connected between a fifth section and a sixth section of the six sections of the DC power distribution network,
  a series-connection of a fourth transfer switch and a fifth transfer switch of the nine transfer switches is connected between the first section and the third section of the DC power distribution network,
  a series-connection of a sixth transfer switch and a seventh transfer switch of the nine transfer switches is connected between the second section and the fourth section of the DC power distribution network,
  an eighth transfer switch of the nine transfer switches is connected between the fifth section and a first junction between the fourth transfer switch and the fifth transfer switch,
  a ninth transfer switch of the nine transfer switches is connected between the sixth section and a second junction between the sixth transfer switch and the seventh transfer switch, and a main circuit breaker of the at least one main circuit breaker is connected between the first junction and the second junction.

12. The switchyard according to claim 10, being arranged for disconnecting any one of the at least six sections of the DC power distribution network by opening three of the nine transfer switches and, subsequently, one main circuit breaker of the at least one main circuit breaker.

13. The switchyard according to claim 1, further comprising at least three first disconnectors, one for each of the at least three sections of the DC power distribution network, wherein the at least three first disconnectors are arranged for galvanically isolating the disconnected section from the switchyard.

14. The switchyard according to claim 13, further comprising second disconnectors being arranged for bypassing at least one main circuit breaker of the at least one main circuit breaker and the transfer switches.

15. The switchyard according to claim 1, wherein at least one of the at least one main circuit breaker comprises a plurality of power semiconductor switching elements connected in series.

16. The switchyard according to claim 1, wherein the transfer switch comprises a disconnector and an auxiliary switch connected in series.

17. The switchyard according to claim 1, comprising at least two main circuit breakers and a plurality of disconnectors arranged for at least momentarily galvanically isolating at least one of the at least two main circuit breakers and the at least four transfer switches from the switchyard, wherein the at least two main circuit breakers and the at least four transfer switches are arranged so as to enable to individually disconnect any one of the at least three sections of the DC power distribution network while one of the at least two main circuit breakers and the at least four transfer switches is isolated from the switchyard by means of the plurality of disconnectors.

18. A method of a switchyard, for disconnecting any one of at least three sections of a direct current, DC, power distribution network connected to the switchyard, the switchyard comprising:
   at least one main circuit breaker, and
   at least four transfer switches,
   wherein the at least one main circuit breaker and the at least four transfer switches are arranged so as to enable to individually disconnect any one of the at least three sections of the DC power distribution network,
   the method comprising:
   opening at least two of the at least four transfer switches, and opening a main circuit breaker of the at least one main circuit breaker.

19. The method according to claim 18, the switchyard further comprising: at least three first disconnectors, one for each of the at least three sections of the DC power distribution network,
   wherein the at least three first disconnectors are arranged so as to galvanically isolate a disconnected section from the switchyard,
   the method further comprising:
   opening the respective first disconnector of the disconnected section.

20. The method according to claim 19, further comprising: re-closing the two transfer switches.

* * * * *